United States Patent Office 3,791,960
Patented Feb. 12, 1974

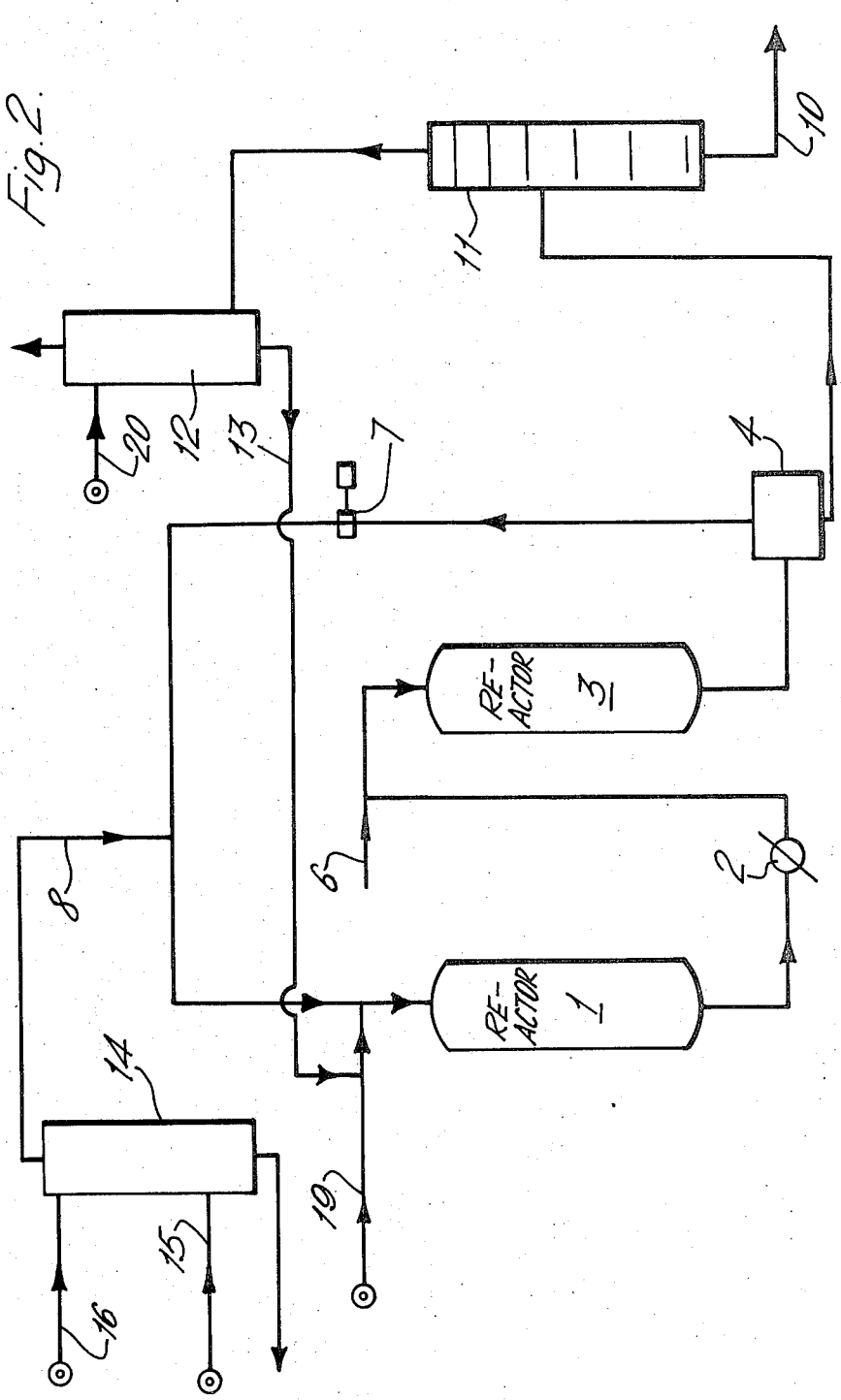

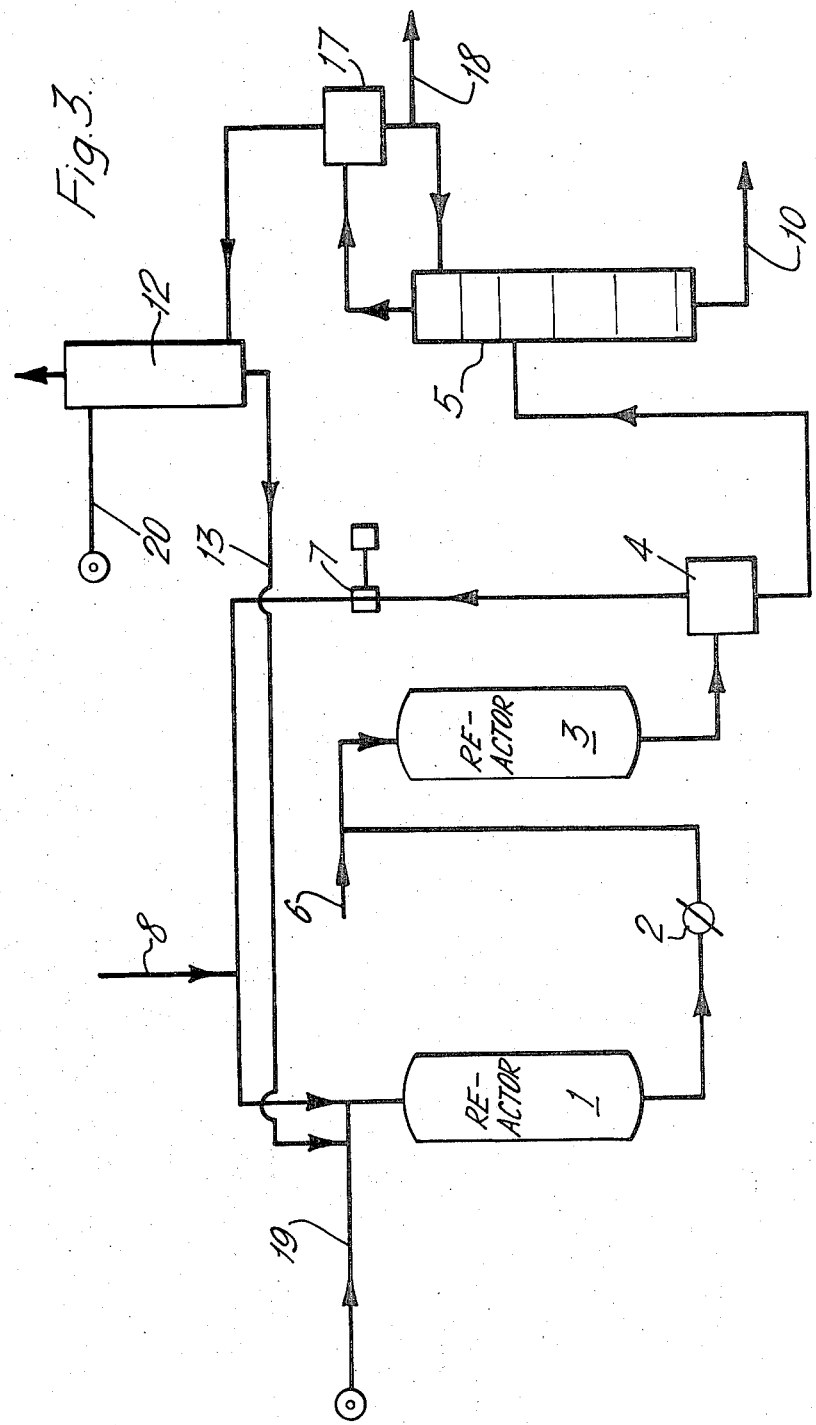

3,791,960
ISOMERIZATION OF PARAFFIN HYDROCARBONS
Owen Mansel Davies, Enfield, Martin Frederick Olive, Lightwater, Terence John Cook, Twickenham, and Graham Keith Hilder, Addlestone, England, assignors to The British Petroleum Company Limited, London, England
Filed Mar. 29, 1972, Ser. No. 239,232
Claims priority, application Great Britain, Apr. 19, 1971, 9,787/71; Aug. 10, 1971, 37,437/71
Int. Cl. C10g 39/00
U.S. Cl. 208—57      13 Claims

ABSTRACT OF THE DISCLOSURE

A two stage hydrogenation-isomerization unit operating in the presence of a chloride activator has a common gas recycle system and the chloride activator is added between the hydrogenation and isomerization stages.

The hydrogenation stage operates at 150–350° C. and the isomerization stage at 100–204° C. but in any case below the hydrogenation stage. Both catalysts comprise a platinum group metal and chlorine or alumina. The isomerization catalyst preferably has from 8–15% wt. Cl; the hydrogenation catalyst may have 6–8 %wt. Cl when functioning solely as a hydrogenation catalyst or 8–15% wt. chlorine when it functions as a combined hydrogenation/partial isomerization catalyst.

The pressures and hydrogen/hydrocarbon mole ratios are the same in both stages being preferably 20–75 bars gauge and 0.5 to 5:1. The space velocities in the two stages are preferably such that the ratios of catalyst are 6:1 to 3:1 vols. of catalyst in the isomerization zone/vol. of catalyst in the isomerization zone/vol. of catalyst in the combined hydrogenation/partial isomerization zone.

---

This invention relates to the isomerization of paraffin hydrocarbons in the gasoline boiling range (i.e. $C_4$–204° C.) at temperatures in the range 100–204° C., and particularly to the isomerization of $C_5$ and $C_6$ paraffins.

Low temperature isomerization using fixed catalyst beds is now well established. The catalysts comprise a hydrogenating metal, usually a platinum group metal, on a refractory inorganic oxide support, usually alumina, to which chlorine has been added. To obtain a low temperature isomerization catalyst the method of chlorination is critical and various methods of chlorination have been proposed, the principal methods being contacting the support with (a) a chlorinated hydrocarbon of general formula

(where X and Y may be the same or different and selected from H, Cl, Br, F or SCl, or where X and Y together may be O or S). The preparation of this type of catalyst is described in U.K. patent specification No. 953,187 and its use for low temperature isomerization in U.K. patent specification No. 953,189.

(b) an organic chloride activating agent containing at least 2 carbon atoms and an atomic ratio of hydrogen to chlorine of less than 1.0, e.g. chlorinated derivatives of ethane or ethylene having at least 4 chlorine atoms. U.K. patent specifications disclosing activating agents of this type are 976,941, 1,061,369 and 1,081,120.

(c) methylchloroform (U.S. Pat. No. 3,527,717).

(d) thionyl chloride or other compound of sulphur and chlorine having the general formula

(where S is sulphur, O is oxygen, X is chlorine and Y is a halogen other than chlorine, $n=1$ or 2, $a=0$, 1, 2, 3 or 5, $b=2$, 4 or 7, $c=0$ or 1 and the sum of $b$ and $c$ is 2 to 8). The use of thionyl chloride is described in U.K. patent specification No. 1,028,572 and the generic formula in U.K. patent specification No. 1,087,586.

(e) gaseous chlorine together with certain hydrocarbons or chlorinated hydrocarbons (U.K. patent specification No. 1,155,516) or together with sulphur dioxide (U.S. patent specification No. 3,472,790).

(f) vapor of aluminium chloride followed by heating to above 300° C. to remove unreacted aluminium chloride (U.K. patent specification No. 822,998).

In cases (a) to (e) above the contacting should be under essentially non-reducing conditions and at a temperature such that there is no formation of aluminium chloride. The use of oxidizing conditions is preferred and may be necessary with chlorinating agents having 2 or more carbon atoms. The simplest and preferred compounds are those of case (a) above, the particular preferred compounds being $CCl_4$, $CHCl_3$ and $CH_2Cl_2$.

The activity of the catalysts may be promoted or maintained by operating in the presence of hydrogen chloride or a compound decomposable to hydrogen chloride under the isomerization conditions, such as process being described and claimed, for example, with relation to catalysts prepared from compounds (a) above in U.K. Pat. No. 953,188.

The catalysts are known to be sensitive to the presence of water, sulphur compounds and aromatics. Water and sulphur compounds in a feedstock can be reduced to low levels by the use of standard drying and desulphurization techniques prior to the isomerization. Aromatics can also be hydrogenated to naphthenes, but the most convenient method and place for carrying out this hydrogenation is less clear.

The present invention proposes that this hydrogenation should be carried out in a reaction zone ahead of the main isomerization zone but linked to it by a common gas recycle system.

With a common gas recycle system, the hydrogen chloride activating agent in the isomerization zone will be at least partially recycled with the gas to the hydrogenation zone, and this leads on to the need to determine the most suitable activating agent or activating agent precursor and also the most suitable point of injection into the cyclic system. The present invention is particularly concerned with this aspect of a common gas recycle system.

While hydrogen chloride itself is a suitable additive, there are practical problems in adding it to systems operating under high pressure. Normally liquid chloro-substituted derivatives of hydrocarbons, for example chloro-substituted derivatives of $C_1$–$C_4$ aliphatic hydrocarbons are easier to inject, carbon tetrachloride being particularly suitable. However, it has been found that when using a chloro-substituted derivative of a hydrocarbon, the point at which it is injected has a significant influence on the efficiency of the process.

According to the present invention, therefore, a process for the isomerization of paraffin hydrocarbons in the gasoline boiling range at a temperature in the range 100–204° C. using a catalyst comprising a platinum group hydrogenating metal, a refractory oxide support, and chlorine present in active isomerization sites is characterized in that a feedstock containing paraffin hydrocarbons and a minor proportion of aromatics is first of all passed to a hydrogenation zone containing a catalyst comprising a platinum group hydrogenating metal, a refractory oxide support and chlorine and operating at a temperature in the range 150–350° C. in the presence of a hydrogen chloride containing hydrogen-rich recycle gas stream to hydrogenate the aromatics, the total effluent from this zone is then cooled and passed to an isomerization zone at said temperature of 100–204° C., a compound decomposable to hydrogen chloride in the isomerization zone is added to the system between the hydrogenation zone and the isomerization zone and the isomerization zone effluent is treated to separate a hydrogen chloride containing hydrogen-rich recycle gas stream which is recycled to the hydrogenation zone.

Thus the invention proposes that the compound decomposable to hydrogen chloride is added so that it is decomposed in the isomerization zone and not in the hydrogenation zone. This latter zone contains hydrogen chloride because a hydrogen-chloride containing gas stream is recycled to it, but it is not required to perform the initial decomposition of the compound to hydrogen chloride. Without being bound by any theory it is postulated that the simultaneous presence of a compound such as carbon tetrachloride and aromatics in this hydrogenation zone operating as it does at a temperature above 150° C. with a chlorinated platinum group metal catalyst produces some by-product or side-reaction which progressively reduces catalyst activity in both zones.

The temperature is believed to be the critical factor in this catalyst deactivation. Below 150° C. no detrimental effect are readily observed when aromatics and carbon tetrachloride are present together, but it is necessary to use a temperature above 150° C. in order to give satisfactory hydrogenation at realistic hydrogen partial pressure.

In the isomerization zone there are no aromatics so the by-product or side reaction is not produced even though the temperature of this zone may exceed 150° C.

The amount of compound decomposable to hydrogen chloride may conveniently be within the range 0.001 to 5% wt. of chlorine by weight of feedstock. The method of separating the HCl-containing hydrogen-rich recycle gas stream from the isomerization zone effluent may be a conventional high pressure separator, the amount of HCl being separated with the hydrogen reaching, under constant conditions, an equilibrium. Preferably the addition of compound decomposable to HCl is such that the recycle gas contains 0.12% mol of HCl.

Any convenient hydrogen-rich gas can be used as make-up gas for the recycle system, for example the hydrogen-rich exit gas from a platinum catalyst reformer. This may itself contain a small amount of HCl.

The catalytic reformer exit gas may contain 30% or more of light hydrocarbons particularly methane and ethane and the gas may be contacted with a hydrocarbon stream to absorb these hydrocarbons and increase the purity of the gas to 90% or more of hydrogen. A suitable hydrocarbon stream is a $C_5/C_6$ fraction, e.g. the feedstock to the process, which should then be stripped to remove the absorbed light hydrocarbons before passing to the isomerization system.

The isomerization zone effluent after separation of the recycle gas stream may be distilled to separate any residual HCl, hydrogen and $C_1$–$C_4$ hydrocarbons and this additional HCl may also be recycled after separation, as far as possible, from the hydrocarbons.

Since a common recycle gas system is used it follows that the hydrogen:hydrocarbon mole ratio will be substantially the same in both hydrogenation and isomerization zones, being preferably 0.1 to 15:1 and more particularly 0.5 to 5:1. Desirably the pressure is the same in both zones within the range 14 to 140 bars gauge, more particularly 20 to 75 bars gauge.

The temperature in the hydrogenation zone should be higher than in the isomerization zone and the space velocities may also be different. Within the present invention, there are two principal embodiments which may affect the precise temperature and space velocity in each zone. These are (i) where the hydrogenation catalyst contains chlorine in a form which does not give low temperature isomerization activity
(ii) where the hydrogenation catalyst contains chlorine in a form which gives low temperature isomerization activity and in which the hydrogenaton catalyst is preferably prepared in the same manner as the isomerization catalyst.

The present invention has been found to be beneficial with both embodiment (i) and (ii).

In embodiment (i) the metal used for hydrogenation zone catalyst is preferably present in an amount of 0.01 to 5% wt. and is preferably platinum or palladium. The support is preferably alumina, any of the aluminas known for hydrogenation and/or reforming catalysts being suitable. When such a catalyst is exposed to an atmosphere containing HCl it will take up chlorine to an equilibrium level. This level may be up to 8% wt. depending on the alumina used and the concentration of HCl present. Thus the catalyst would become chlorinated simply by contact with the common HCl-containing recycle gas stream. However, reaction of chlorine containing compounds with supports such as alumina releases water and it would, therefore, be clearly undesirable to allow the hydrogenation zone catalyst to become chlorinated during the actual hydrogenation. The catalyst is, therefore, chlorinated before use, preferably in situ in the reactor and preferably with recovery of the chlorination effluent gases so that these gases do not pass to the isomerization zone. The chlorinating compound used and the conditions of chlorination are not critical provided the catalyst is chlorinated at least to the equilibrium level which will exist under the hydrogenation conditions, thereby ensuring that there is no further chlorination and release of water during hydrogenation.

In practice, a chlorine content of from 6 to 8% wt. constitutes a suitable level for the range of hydrogenation conditions normally used. Since, as explained hereafter, it is desirable to chlorinate the isomerization zone catalyst to a higher chlorine level, one suitable method of preparing the hydrogenation zone catalyst is to chlorinate it in the same way as the isomerization zone catalyst and then to reduce the chlorine content by treating the catalyst with hydrogen or nitrogen at, preferably, 260–538° C.

In this embodiment the principal reaction is hydrogenation of the aromatics. The preferred temperature is 150–300° C. and the preferred space velocity 1 to 20 v./v./hr., more particularly 3–15 v./v./hr. The preferred isomerization zone conditions with this embodiment are temperatures of 120 to 204° C. and space velocities of 1 to 5 v./v./hr.

In embodiment (ii) the hydrogenating metal and the support may be as for embodiment (i) but the catalyst is chlorinated, preferably in situ in the reactor, in a manner similar to the catalyst in the isomerization zone without any subsequent reduction of the chlorine content. In these circumstances in addition to the hydrogenation of aromatics there may be some isomerization of the paraffins and also some cracking of naphthenes, which although not isomerization catalyst poisons do tend to suppress catalyst activity. This embodiment is dependent on the relatively rapid hydrogenation of the aromatics before they can poison the catalyst. The temperature is, as stated earlier, higher than that in the isomerization zone and is preferably in the range 150 to 250° C. The space velocity may be from 1 to 15 v./v./hr. preferably 3 to 10 v./v./hr. The partial isomerization in this hydrogenation zone may allow lower temperatures and/or higher space velocities in the main isomerization zone, for example 100 to 180° C. and 2 to 10 v./v./hr.

The space velocities in the two zones are an expression of the relative amounts of catalyst in the two zones.

When the first zone is used for hydrogenation only the space velocity is generally higher than in the isomerization zone, i.e. a smaller quantity of catalyst is used. Suitable ratios are from 6:1 to 3:1 vols. of catalyst in the isomerization zone/vol. of catalyst in the hydrogenation zone. When the first zone is used both for hydrogenation and isomerization a relatively larger amount of catalyst may be required, the inlet end of the bed catalyzing the hydrogenation and the outlet end the isomerization. Suitable ratios with this embodiment are from 4:1 to 1:1 vols. of catalyst in the second zone/vol. of catalyst in the first isomerization zone.

The preferred feedstocks are straight run petroleum fractions and since aromatics are not likely to occur in $C_4$ and $C_5$ fractions the process is particularly suitable for $C_6$ and $C_5/C_6$ fractions. The aromatics content is likely to be 0.01 to 10% wt., more particularly 0.1 to 5% wt. Naphthene contents may be up to 25% wt. but fractions are preferably chosen containing less than 10% wt., more particularly less than 5% wt., of naphthenes, since naphthenes are of more value as constituents of catalytic reformer feedstocks. The sulphur and water contents are desirably below 0.0003% wt. in each case.

The hydrogenation zone preferably reduces the aromatics content to below 0.001% wt.

The preparation and preferred composition of the isomerization catalyst, whether present in the isomerization zone only or in both hydrogenation and isomerization zones may follow known practice e.g. as disclosed in U.K. patent specifications Nos. 953,187, 953,188, 953,189 and 1,038,867. The alumina preferably has a surface area of at least 250 $m^2$/g. and is preferably derived from an alumina hydrate precursor in which $\beta$-alumina trihydrate (bayerite) predominates. The chlorine content of the catalyst may be 1–15% wt., particularly 8–15% wt., and is desirably related to the original surface areas of the alumina, being from 2.0 to 3.5 x $10^{-4}$ g./$m.^2$. In this catalyst preparation, the chlorination temperature may be in the range 149–593° C., particularly 149–371° C., and the rate of addition of the chlorine compound is such that its partial pressure does not exceed 0.2 p.s.i. As indicated earlier the conditions should be non-reducing and may be oxidizing conditions and, preferably, a carrier gas is used, which may be nitrogen, air or oxygen at a flow rate of at least 50 lbs./hour/sq. ft. of catalyst bed. The chlorination is desirably carried out in situ in the reactor and the conditions specified above are chosen so that the chlorinating compound is not reduced to HCl and so that the formation of aluminium chloride and volatile hydrogenating metal-chlorine complexes is minimized.

The isomerization catalyst may be regenerated by treatment initially with hydrogen or nitrogen at 260–538° C. followed by treatment with a free oxygen-containing gas, preferably one containing 0.1–5% volume $O_2$, also at 260–538° C. It is then rechlorinated before re-use using a technique similar to the activation procedure. The hydrogenation catalyst may also be regenerated with an oxygen-containing gas, rechlorinated, and treated to reduce the chlorine content if necessary.

The complete specification of U.K. patent application No. 03,161/71 describes and claims a method of starting up an isomerization process in which the catalyst bed is brought to an operating temperature of 100–204° C., preferably 130–204° C., before feedstock and an activating agent such as $CCl_4$ contact the catalyst bed. This method of start up is desirably used with the process of the present invention.

The invention is illustrated in the accompanying drawings in which

FIG. 2 is the system of FIG. 1 with additional chloride recovery and hydrogen purification steps added, and FIG. 3 is the system of FIG. 1 with an alternative chloride recovery system.

Figure 1:
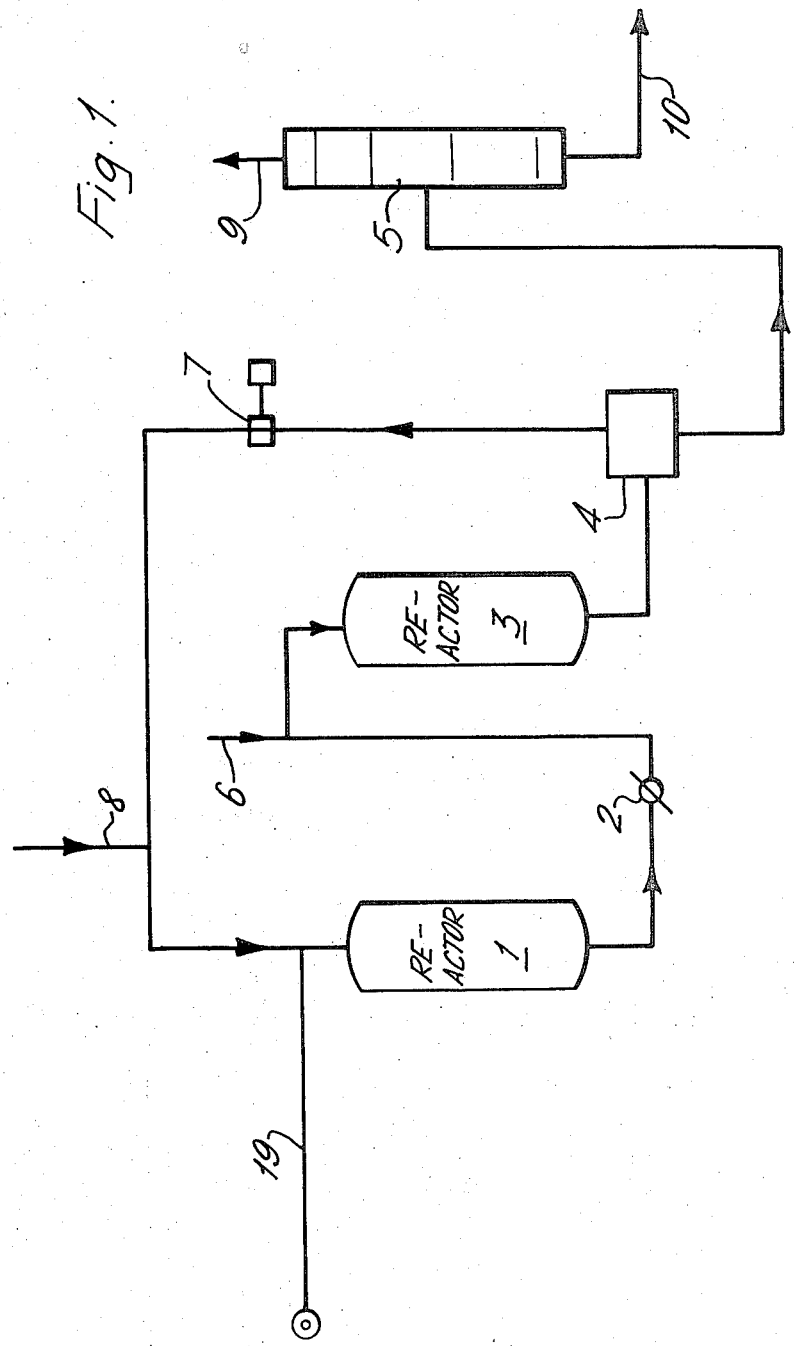
FIG. 1 is a flow sheet of a system according to the present invention.

In FIG. 1, feedstock passes from line 19 in series through reactor 1, cooler 2, reactor 3, a high pressure separator 4, and a stabilizer column 5. Halide activator e.g. carbon tetrachloride is added through line 6, between reactors 1 and 3. Hydrogen rich gas containing some HCl is recycled from the high pressure separator 4, and a stabilizer column 5. Halide activator e.g. carbon tetrachloride is added through line 6, between reactors 1 and 3. Hydrogen rich gas containing some HCl is recycled from the high pressure separator 4 to reactor 1, using a compressor 7, make-up hydrogen being added through line 8. Liquid product from the high pressure separator is distilled in stabilizer column 5, with HCl and $C_1$ and $C_4$ hydrocarbons coming overhead through line 9 for disposal and a $C_5+$ product being recovered as bottoms through line 10.

Typical conditions in the system are

FEEDSTOCK $C_5/C_6$ gasoline fraction
0.0003% wt. sulphur
0.0003% wt. water
3% wt. benzene
5% wt. naphthenes
0.06% wt. of carbon tetrachloride by weight of feedstock added through line 6

REACTOR 1

|  | As hydrogenation unit | As hydro/genation-isomerization unit |
|---|---|---|
| Temperature, ° C | 230 | 200 |
| Pressure, bars gauge | 24 | 24 |
| Space velocity, v./v./hr | 8 | 4 |
| $H_2$:HC mole ratio | 2.5:1 | 2.5:1 |
| Catalyst percent wt. (on alumina) | 0.35 / 7 | 0.35 / 12 |

REACTOR 3

|  | Following hydrogenation unit | Following hydrogenation/isomerization unit |
|---|---|---|
| Temperature, ° C | 150 | 145 |
| Pressure, bars gauge | 23 | 23 |
| Space velocity, v./v./hr | 2 | 2 |
| $H_2$:HC mole ratio | 2.5:1 | 2.5:1 |
| Catalysts, percent wt. (on alumina) | 0.35 / 12 | 0.35 / 12 |

HIGH PRESSURE SEPARATOR

Temperature ° C__ 38
Pressure bars gauge__ 22
Recycle gas composition:
  $H_2$ percent mol__ 90
  HCl do____ 0.3
  $C_1$–$C_4$ hydrocarbons do____ 9

MAKE-UP GAS

95% mol hydrogen

STABILIZER COLUMN

Base temperature ° C__ 155
Base pressure bars gauge__ 10.5
Liquid recovery based on original feed__percent wt__ 97

FIG. 2 has further hydrogen chloride recovery from the product, the stabilizer column 5 of FIG. 1 being replaced by a stripper column 11 operating at 132° C. and 10 bars gauge. The overheads (HCl, $H_2$, $CH_4$ and $C_2H_6$) are then passed countercurrent to a portion of the $C_5/C_6$ feedstock (line 20) in HCl absorber 12 operating at 38° C., 8.5 p.s.i.g. and a molar HCl stripper overhead gas: absorber liquid ratio of 0.06:1. 98% of the HCl is absorbed in the $C_5/C_6$ fraction but the hydrogen and approximately 20% of the $C_1$–$C_2$ are not absorbed and are vented overhead. The $C_5/C_6$ feedstock is fed via line 13 to the reactor 1. The product withdrawn through line 10 from the base of the stripper column 11 contains any $C_3$ and $C_4$ hydrocarbons produced as well as the $C_5/C_2$ isomerized product.

Also shown in FIG. 2 is a purification unit 14 for the make-up hydrogen. Make-up gas taken from a catalytic reformer is fed through line 15 countercurrent to $C_5/C_6$ feedstock 16. The conditions in the unit are 38° C., 27 bars gauge and a molar gas:liquid ratio of 0.08:1. The hydrogen content of the make-up gas is increased from 70 to 95% mol, the $C_1$–$C_4$ hydrocarbons in it being absorbed in the $C_5/C_6$ fraction. The absorbed hydrocarbons are stripped out before the fraction is fed to reactor 1, for example by being recycled to the stripper column of the hydrodesulphurization unit used to desulphurize the feedstock. This hydrogen purification unit may be used with the systems of FIG. 1 and FIG. 3 if desired.

FIG. 3 has a stabilizer column 5 similar to FIG. 1. This stabilizer column has however a reflux drum 17 in which $C_3$ and $C_4$ hydrocarbons are separated through line 18 from HCl, $CH_4$ and $C_2H_6$ which then passes to an HCl absorber 12 similar to that used in FIG. 2.

The invention is further illustrated by the following examples.

Example 1

In a two-reactor system as shown in FIG. 1, both reactors initially contained catalysts of 0.35% wt. platinum on alumina. The catalyst in reactor 3 was separately prepared in situ by chlorinating the platinum-alumina, which had a surface area of 425 m.²/g. with a stream of $CCl_4$ in air flowing at a mass velocity of 150 lbs./hr./sq. ft. Initially the catalyst bed was at 200° C. and the amount of $CCl_4$ was 0.25% volume of the air stream. After the initial exotherm had subsided the amount of $CCl_4$ was increased to 0.5% vol. and the catalyst bed temperature to 230° C. The chlorination was continued until 25% wt. of $CCl_4$ by wt. of catalyst had been passed over the platinum-alumina. The catalyst in reactor 1 was the same platinum-alumina with 7% wt. chlorine instead of 11.5% wt. chlorine.

The system was used to isomerize a petroleum fraction having an ASTM boiling range of 37.5 to 77° C. and the following composition

|   | Percent wt. |
|---|---|
| $C_5$ paraffins | 45.8 |
| $C_6$ paraffins | 46.2 |
| Naphthenes | 4.7 |
| Aromatics | 3.0 |
| Sulphur | 0.003 |

The process conditions in the two reactors were

|   | Reactor 1 | Reactor 3 |
|---|---|---|
| Temperature, °C | 180 | 146 |
| Pressure, bars gauge | 45 | 45 |
| Space velocity, v./v./hr | 8 | 2.5 |
| $H_2$:HC mole ratio | 2.5:1 | |
| $CCl_4$ injection, percent wt. on feedstock | 0.4 | |
| HCl content of recycle, percent mol gas | 0.7 | |

In an extended run, the first 450 hours were used for various process investigations. An investigation into the effect of varying the position of injection of the $CCl_4$ was carried out from 450 HOS, with the results set out in Table 1 below.

TABLE 1

|   | $CCl_4$ injected ahead of Reactor 1 | | | | $CCl_4$ injected between Reactors 1 and 3 | | | | |
|---|---|---|---|---|---|---|---|---|---|
| Hours on stream | 450 | 455 | 460 | 465 | 555 | 570 | 585 | 595 | 605 |
| Reactor 1: | | | | | | | | | |
| $C_5$ conversion | 48.0 | 48.0 | 48.0 | 48.0 | 48.0 | 48.0 | 48.0 | 48.0 | 48.0 |
| $C_6$ conversion | 2.5 | 2.5 | 2.5 | 2.5 | 2.5 | 2.5 | 2.5 | 2.5 | 2.5 |
| Reactor 3: | | | | | | | | | |
| $C_5$ conversion | 67 | 66 | 64.7 | 64.2 | 65.7 | 65.8 | 65.7 | 65.8 | 65.9 |
| $C_6$ conversion | 26 | 24.5 | 23.5 | 22.5 | 24.4 | 25.0 | 24.6 | 25.0 | 25.2 |

Note.—

$$C_5 \text{ conversion} = \frac{\text{Isopentane}}{\text{Isopentane} + \text{n-pentane}} \times 100\% \text{ wt.}$$

$$C_6 \text{ conversion} = \frac{2,2\text{-dimethylbutane}}{C_6 \text{ acyclic paraffins}} \times 100\% \text{ wt.}$$

With the $CCl_4$ injected ahead of reactor 1 there was a steady decline in the activity of the catalyst in reactor 3 over the period 450–465 HOS suggesting that some impurity was being carried forward into that reactor. The reactor 1 catalyst which was operating as a hydrogenation catalyst showed no change in activity.

The point of injection of the $CCl_4$ was changed at 465 HOS to between reactors 1 and 3. The change-over resulted in the temporary loss of all the HCl from the recycle system. This built up again over the period 465–555 HOS with a steady improvement in the activity of the reactor 3 catalyst. The results over the period 555–605 HOS show a steady or slightly increasing isomerization activity of the reactor 3 catalyst, as compared with a rapidly declining activity over the period 450–465 HOS.

Example 2

In a two reactor system as shown in FIG. 1, reactor 1 contained a catalyst containing 0.35% wt. platinum chlorinated to the equilibrium level that would exist under the subsequent hydrogenation conditions (7% wt.). Reactor 3 contained a catalyst containing 0.35% wt. platinum and 11.5% wt. chlorine on alumina prepared in situ by chlorinating a platinum-alumina having surface area of 425 m.²/g. with a stream of $CCl_4$ in air flowing at a mass velocity of 50 lbs./hr./sq. ft. Initially the catalyst bed was at 200° C. and the amount of $CCl_4$ was 0.3% volume of the air stream. After the initial exotherm had subsided the amount of $CCl_4$ was increased to 0.5% vol. and the catalyst bed temperature to 230° C. The chlorination was continued until 25% wt. of $CCl_4$ by wt. of catalyst had been passed over the platinum-alumina.

The system was used to isomerize a petroleum fraction having an ASTM boiling range of 31 to 76° C. and the following composition

|   | Percent wt. |
|---|---|
| $C_5$ paraffins | 43.9 |
| $C_6$ paraffins | 48.8 |
| Naphthenes | 4.6 |
| Aromatics | 2.7 |
| Sulphur | 0.0003 |

The process conditions in the two reactors were

|   | Reactor 1 | Reactor 3 |
|---|---|---|
| Temperature, °C | 185 | 145 |
| Pressure, bars gauge (p.s.i.g.) | 36.5(530) | |
| Space velocity, v./v./hr | 8.0 | 2.0 |
| $H_2$:HC mole ratio | 2.5=1 | |
| $CCl_4$ injection, percent wt. (on feedstock) | 0.4 | |
| HCl content of recycle gas, percent mol | 1.5 | |

Stable conversions as set out in Table 2 below were obtained until the run was voluntarily terminated at 230 HOS.

TABLE 2

|  | Feed | Reactor 1 effluent | Reactor 3 effluent |
|---|---|---|---|
| $C_5$ conversion, percent wt. | 47.1 | 48.0 | 71.5 |
| $C_6$ conversion, percent wt. | 2.0 | 3.0 | 33.0 |
| Benzene | 2.7% wt. | 5 p.p.m. wt. | Nil. |

Note.—

$$C_5 \text{ conversion} = \frac{\text{Isopentane}}{C_5 \text{ acyclic paraffins}} \times 100\% \text{ wt.}$$

$$C_6 \text{ conversion} = \frac{2,2\text{-dimethylbutane}}{C_6 \text{ acyclic paraffins}} \times 100\% \text{ wt.}$$

We claim:

1. A process for the isomerization of paraffin hydrocarbons in the gasoline boiling range at a temperature in the range 100–204° C. using a catalyst comprising from 0.01 to 5% weight of a platinum group hydrogenating metal, a refractory oxide support, and from 1–15% weight of chlorine present in active isomerization sites characterized in that a feedstock containing paraffin hydrocarbons and a minor proportion of aromatics is first of all passed to a hydrogenation zone containing a catalyst comprising 0.01 to 5% weight of a platinum group hydrogenating metal, a refractory oxide support and chlorine in an amount at least equal to the equilibrium level which will exist under hydrogenation conditions and operating at a temperature in the range 150 to 350° C. in the presence of a hydrogen chloride containing hydrogen-rich recycle gas stream to hydrogenate the aromatics, the total effluent from this zone is then cooled and passed without any separation of hydrogen to an isomerization zone at said temperature of 100–204° C., a compound decomposable to hydrogen chloride in the isomerization zone is added to the system between the hydrogenation zone and the isomerization zone and the isomerization zone effluent is treated to separate a hydrogen chloride containing hydrogen-rich recycle gas stream which is recycled to the hydrogenation zone.

2. A process as claimed in claim 1 wherein the compound decomposable to hydrogen chloride is carbon tetrachloride.

3. A process as claimed in claim 1 wherein the amount of the compound decomposable to hydrogen chloride is from 0.001 to 5% wt. of chlorine by weight of feedstock giving 0.1–2% mol of HCl in the recycle gas.

4. A process as claimed in claim 1 wherein in both the hydrogenation and isomerization zones the hydrogen:hydrocarbon mole ratio is from 0.1 to 15.1 and the pressure is from 14 to 140 bars gauge.

5. A process as claimed in claim 4 wherein the hydrogen:hydrocarbon mole ratio is from 0.5 to 5:1 and the pressure is from 20 to 75 bars gauge.

6. A process as claimed in claim 1 wherein the hydrogenation zone is operated at 150° C.–300° C. and 3–15 v./v./hr. and the isomerization zone at 120°–204° C. and 1–5 v./v./hr.

7. A process as claimed in claim 6 wherein the ratio of catalyst in the isomerization zone to that in the hydrogenation zone is from 6:1 to 3:1.

8. A process as claimed in claim 6 wherein the catalyst in the hydrogenation zone comprises the platinum group metal, alumina and from 6 to 8% wt. chlorine.

9. A process as claimed in claim 1 wherein the hydrogenation zone, which acts as a combined hydrogenation/partial isomerization zone, is operated at 150–250° C. and 3–10 v./v./hr. and the isomerization zone at 100–180° C. and 2–10 v./v./hr.

10. A process as claimed in claim 9 wherein the ratio of catalyst in the isomerization zone to that in the hydrogenation/isomerization zone is from 3:1 to 1:1.

11. A process as claimed in claim 9 wherein the catalyst in both zones comprises the platinum group metal, alumina and from 8–15% wt. of chlorine.

12. A process as claimed in claim 1 wherein the feedstock comprises a $C_6$ or $C_5/C_6$ fraction having from 0.01 to 10% wt. of aromatics and the aromatics are reduced in the hydrogenation zone to below 0.001% wt.

13. A process as claimed in claim 1 wherein further hydrogen chloride is recovered from the product, in addition to that separated with the recycle gas, and this further hydrogen chloride is recycled to the reaction system.

References Cited

UNITED STATES PATENTS

| 2,493,499 | 1/1950 | Perry | 208—57 |
| 3,449,264 | 6/1969 | Myers | 260—683.68 |
| 2,739,927 | 3/1956 | Doumani | 260—683.68 |

HERBERT LEVINE, Primary Examiner

U.S. Cl. X.R.

260—683.68

PO-1050
(5/69)

UNITED STATES PATENT OFFICE
CERTIFICATE OF CORRECTION

Patent No. 3,791,960      Dated February 12, 1974

Inventor(s) Owen Mansel Davies, Martin Frederick Olive, Terence John Cook and Graham Keith Hilder It is certified that error appears in the above-identified patent and that said Letters Patent are hereby corrected as shown below:

Column 2, line 26, "as" should read -- a --;

Column 3, line 26, "effect" should read -- effects --;

Column 3, line 30, "pressure" should read -- pressures --;

Column 3, line 43, "0.12%" should read -- 0.1 - 2% --;

Column 4, line 41, the sentence beginning "Since, as explained ..." should begin a new paragraph;

Column 5, line 34, "(bayerite)" should read -- (Bayerite) --;

Column 5, line 36, "areas" should read -- area --;

Column 6, line 8, cancel ", and a ";
          lines 9, 10 and 11, cancel these lines;
          line 12, cancel "the high pressure separator 4"; and Column 8, line 69, "2.5=1" should read -- 2.5:1 --.

Signed and sealed this 11th day of June 1974.

(SEAL)
Attest:

EDWARD M. FLETCHER, JR.
Attesting Officer

C. MARSHALL DANN
Commissioner of Patents